United States Patent
Akita et al.

(10) Patent No.: US 10,411,501 B2
(45) Date of Patent: Sep. 10, 2019

(54) POWER SUPPLY DEVICE AND SWITCH CONTROL METHOD THEREFOR

(71) Applicant: Sumitomo Electric Industries, Ltd., Osaka-shi (JP)

(72) Inventors: Tetsuo Akita, Osaka (JP); Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 84 days.

(21) Appl. No.: 15/744,145

(22) PCT Filed: Jul. 19, 2016

(86) PCT No.: PCT/JP2016/071149
§ 371 (c)(1),
(2) Date: Jan. 12, 2018

(87) PCT Pub. No.: WO2017/047221
PCT Pub. Date: Mar. 23, 2017

(65) Prior Publication Data
US 2018/0205262 A1    Jul. 19, 2018

(30) Foreign Application Priority Data

Sep. 17, 2015  (JP) ................................ 2015-183628

(51) Int. Cl.
*H02J 9/06* (2006.01)
*H02H 3/04* (2006.01)
(Continued)

(52) U.S. Cl.
CPC ............. *H02J 9/06* (2013.01); *H01H 9/106* (2013.01); *H01H 85/04* (2013.01); *H01H 85/46* (2013.01);
(Continued)

(58) Field of Classification Search
None
See application file for complete search history.

(56) References Cited

U.S. PATENT DOCUMENTS

| | | | | |
|---|---|---|---|---|
| 6,700,802 B2 * | 3/2004 | Ulinski | ..................... | H02J 3/32 307/66 |
| 2009/0206660 A1 * | 8/2009 | Makita | .................. | H02J 7/1423 307/9.1 |

(Continued)

FOREIGN PATENT DOCUMENTS

| | | |
|---|---|---|
| JP | S54-032740 A | 3/1979 |
| JP | H09-046930 A | 2/1997 |

(Continued)

*Primary Examiner* — Jared Fureman
*Assistant Examiner* — Aqeel H Bukhari
(74) *Attorney, Agent, or Firm* — Baker Botts LLP; Michael A. Sartori

(57) ABSTRACT

This power supply device includes: an AC path from an input end to an output end; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including parallel body of a relay contact and a semiconductor switch; and a control unit configured to control the conversion unit and the AC switch. When the control unit executes a current conduction mode for the first time, and when the current sensor detects an excessive current during the current conduction mode, the control unit closes only the relay contact while keeping the semiconductor switch opened.

10 Claims, 4 Drawing Sheets

(51) Int. Cl.
    *H01H 85/04*     (2006.01)
    *H01H 9/10*     (2006.01)
    *H01H 85/46*     (2006.01)
    *H02H 3/08*     (2006.01)
    *H02J 7/00*     (2006.01)
    *H02H 7/26*     (2006.01)

(52) U.S. Cl.
    CPC .............. *H02H 3/046* (2013.01); *H02H 3/08* (2013.01); *H02H 7/26* (2013.01); *H02J 7/0065* (2013.01); *H02J 2007/0067* (2013.01)

(56) References Cited

U.S. PATENT DOCUMENTS

2011/0298414 A1* 12/2011 Manor ................ H02J 7/0054
                                                  320/103
2015/0108833 A1* 4/2015 Ito .......................... H02J 3/383
                                                  307/23

FOREIGN PATENT DOCUMENTS

| JP | 2005-019133 A | 1/2005 |
| JP | 2008-043144 A | 2/2008 |

* cited by examiner

POWER SUPPLY DEVICE AND SWITCH CONTROL METHOD THEREFOR

TECHNICAL FIELD

The present invention relates to a power supply device and a switch control method therefor.

This application claims priority on Japanese Patent Application No. 2015-183628 filed on Sep. 17, 2015, the entire contents of which are incorporated herein by reference.

BACKGROUND ART

For example, an uninterruptible power supply device (UPS: Uninterruptible Power Supply) is a power supply device that normally charges a storage battery by a commercial AC power supply and upon power outage, converts the power stored in the storage battery to an AC power and outputs the AC power.

Such an uninterruptible power supply device has, for example, a configuration in which the same bidirectional inverter is used in common for both charging and discharging of the storage battery (see, for example, Patent Literature 1). In this case, in charging of the storage battery, the bidirectional inverter operates as a converter for performing AC-to-DC conversion, and in discharging of the storage battery, the bidirectional inverter operates as an inverter for performing DC-to-AC conversion. An AC switch is provided for disconnecting the bidirectional inverter and the commercial power supply from each other in discharging of the storage battery.

Such an AC switch is configured from, for example, a relay contact and a semiconductor switch connected in parallel to each other. The relay contact has an advantage of having a smaller conduction resistance than the semiconductor switch, but the time from when a turn-on command is issued (excitation) until the contact is actually closed is longer than in a case of the semiconductor switch. In addition, the relay contact is not suitable for highly frequent current ON/OFF operation. On the other hand, the semiconductor switch has a turn-on speed extremely faster than that of the relay contact, and is suitable even for highly frequent current ON/OFF operation.

Therefore, using the AC switch having the relay contact and the semiconductor switch connected in parallel to each other enables ON/OFF operation that includes both advantages. For example, at the time of starting the uninterruptible power supply device in a case where the commercial power supply is normal, the following operation can be performed in which the semiconductor switch is closed first, then the relay contact is closed, and thereafter the semiconductor switch is opened (see paragraph [0036] in Patent Literature 1). Thus, quick closing by the semiconductor switch at the initial stage is achieved, the relay contact to be closed later is not subjected to stress at the time of closing, and after both are closed, only the relay contact is kept closed, whereby the conduction resistance is reduced.

CITATION LIST

Patent Literature

PATENT LITERATURE 1: Japanese Laid-Open Patent Publication No. 2008-43144

SUMMARY OF INVENTION

A power supply device of the present invention includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, thereby having a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit, wherein, when the current conduction mode is activated for the first time, and when the current sensor detects an excessive current during the current conduction mode, the control unit closes only the relay contact while keeping the semiconductor switch opened.

Another aspect of the present invention is a switch control method for a power supply device that includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, the switch control method being executed by the control unit. The control unit executes a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit. When the current conduction mode is activated for the first time, and when the current sensor detects an excessive current during the current conduction mode, the control unit closes only the relay contact while keeping the semiconductor switch opened.

DESCRIPTION OF EMBODIMENTS

Figure 1:
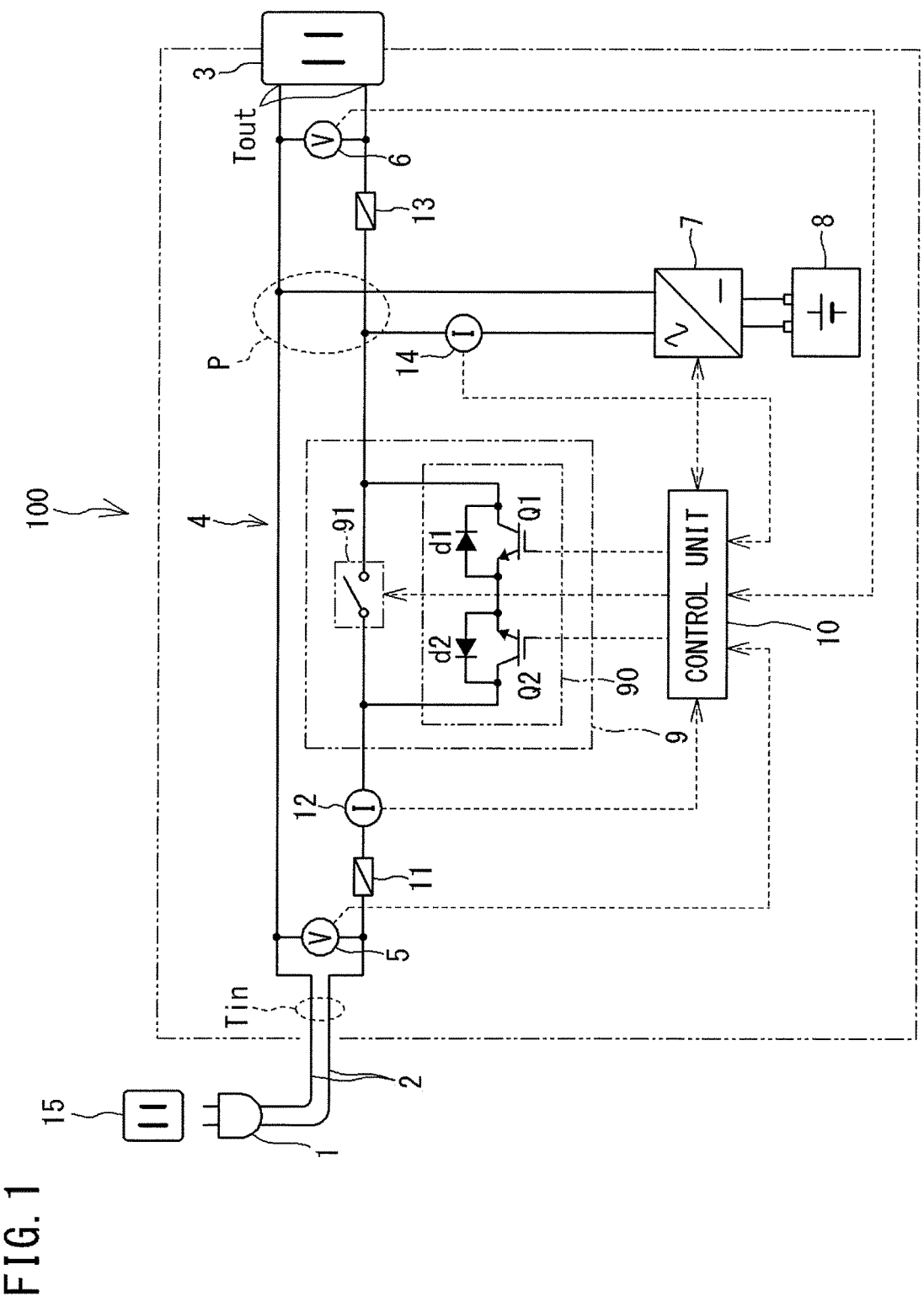
FIG. 1 is a circuit diagram showing a major part of a power supply device.

Problems to be Solved by the Present Disclosure

In the conventional power supply device, for example, in a case where a short-circuit fault has occurred on a load connected to the uninterruptible power supply device, the AC switch at the time of starting the uninterruptible power supply device comes into a so-called short-circuit closed state. In this case, at the moment when the semiconductor switch is closed first, an excessive current flows through the semiconductor switch. When the semiconductor switch interrupts a current beyond a safety operation region or the current conduction capacity thereof is exceeded, the semiconductor switch fails. Using a semiconductor switch having an increased current conduction capacity can prevent such failure, but leads to size increase and cost increase and thus is not practical.

In view of the above conventional problems, an object of the present disclosure is to provide a power supply device that, in an AC switch having a relay contact and a semiconductor switch in combination, enables protection of the semiconductor switch having a less current conduction capacity even if load short-circuit or the like has occurred.

Effects of the Present Disclosure

According to the present disclosure, it is possible to provide a power supply device that enables protection of a semiconductor switch having a less current conduction capacity even if load short-circuit or the like has occurred.

SUMMARY OF EMBODIMENTS

Summary of the embodiments of the present invention includes at least the following.

(1) This power supply device includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, thereby having a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit. When the current conduction mode is activated for the first time, and when the current sensor detects an excessive current during the current conduction mode, the control unit closes only the relay contact while keeping the semiconductor switch opened.

In the above power supply device, when the current conduction mode is activated for the first time, the control unit closes only the relay contact while keeping the semiconductor switch opened. Thus, when an excessive current flows in such a case where, for example, the load connected to the output end is short-circuited, only the relay contact is caused to conduct the excessive current, while no current flows through the semiconductor switch. In addition, also when an excessive current is detected in the current conduction mode, the control unit keeps only the relay contact closed while keeping the semiconductor switch opened. Thus, when a short-circuit fault or the like has occurred in the current conduction mode, the relay contact is caused to conduct the excessive current, while no current flows through the semiconductor switch. In this way, the excessive current is prevented from flowing through the semiconductor switch, whereby failure of the semiconductor switch can be prevented.

(2) The power supply device of (1) may be configured as follows: as a normal operation, at a time of shifting from the current conduction mode to the storage battery discharge mode, the control unit executes an OFF sequence in which closing of the semiconductor switch, opening of the relay contact, and then opening of the semiconductor switch are performed in this order, and at a time of shifting from the storage battery discharge mode to the current conduction mode, the control unit executes an ON sequence in which closing of the semiconductor switch, closing of the relay contact, and then opening of the semiconductor switch are performed in this order; and as an exception, when the current conduction mode is activated for the first time, the control unit closes only the relay contact while avoiding the ON sequence, and when the current sensor detects an excessive current during the current conduction mode, the control unit closes only the relay contact while avoiding the OFF sequence.

Execution of the ON sequence at the first-time activation of the normal mode, and execution of the OFF sequence in the normal operation when an excessive current such as short-circuit current flows in the normal mode and thereby the input voltage is reduced, are avoided as an exception, whereby the semiconductor switch can be protected. In the normal operation, on the other hand, consumption of the relay contact can be suppressed by execution of the ON sequence or the OFF sequence.

On the basis of the above (1) and (2), the following expression is possible. That is, this power supply device includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, thereby having a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit, wherein an operation in which closing of the semiconductor switch, opening of the relay contact, and then opening of the semiconductor switch are performed in this order is defined as an OFF sequence, and an operation in which closing of the semiconductor switch, closing of the relay contact, and then opening of the semiconductor switch are performed in this order is defined as an ON sequence, and in operating the AC switch,
  (a) when the current conduction mode is activated for the first time, the control unit closes only the relay contact while avoiding the ON sequence,
  (b) when shifting to the storage battery discharge mode in a state in which the current detected by the current sensor is not abnormal during the current conduction mode, the control unit executes the OFF sequence, (c) when the current sensor detects an excessive current during the current conduction mode, the control unit closes only the relay contact while avoiding the OFF sequence, and (d) when shifting from the storage battery discharge mode to the current conduction mode, the control unit executes the ON sequence.

(3) The power supply device of (1) or (2) may further include a fuse which is provided on the AC path and is to be blown out after the current sensor detects an excessive current.

In this case, by the fuse being blown out by an excessive current, the period during which the excessive current flows through the relay contact can be reduced to be a short time.

(4) In the power supply device of (3), the control unit may determine that the fuse is blown out, on the basis of a phenomenon in which, after the current detected by the current sensor reaches an abnormality threshold, the current ends up not being detected.

In this case, the blowout of the fuse is taken by a process and a result, and thus can be detected by one current sensor.

(5) In the power supply device of (4), for example, the abnormality threshold may correspond to a condition that a current exceeding a maximum current for a normal case continues being detected during a predetermined period.

In this case, detection according to the time-limit characteristics of fuse blowout can be performed by current and time.

(6) In another aspect, this is a switch control method for a power supply device that includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, the switch control method being executed by the control unit.

The control unit executes a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit. When the current conduction mode is activated for the first time, and when the current sensor detects an excessive current during the current conduction mode, the control unit closes only the relay contact while keeping the semiconductor switch opened.

In the above switch control method for the power supply device, when the current conduction mode is activated for the first time, only the relay contact is closed while the semiconductor switch is kept opened. Thus, when an excessive current flows in such a case where, for example, the load connected to the output end is short-circuited, only the relay contact is caused to conduct the excessive current, while no current flows through the semiconductor switch. In addition, also when an excessive current is detected in the current conduction mode, only the relay contact is kept closed while the semiconductor switch is kept opened. Thus, when a short-circuit fault or the like has occurred in the current conduction mode, the relay contact is caused to conduct the excessive current, while no current flows through the semiconductor switch. In this way, the excessive current is prevented from flowing through the semiconductor switch, whereby failure of the semiconductor switch can be prevented.

DETAILS OF EMBODIMENTS

Hereinafter, the details of embodiments of the present invention will be described with reference to the drawings.

<<Circuit Configuration of Power Supply Device>>

FIG. 1 is a circuit diagram showing a major part of a power supply device. In FIG. 1, the power supply device 100 includes: a plug 1 for AC input; a power supply cord 2 connected to the plug 1; an AC output outlet 3; AC paths 4 composed of two electric paths from an input end Tin to an output end Tout in the power supply device 100; a first voltage sensor 5 for detecting an input voltage at the input end Tin; a second voltage sensor 6 for detecting an output voltage at the output end Tout; a bidirectional inverter as a conversion unit 7 connected to the AC paths 4 and capable of bidirectional power conversion; a storage battery 8 connected to the AC paths 4 via the conversion unit 7; an AC switch 9; and a control unit 10. Operation of the conversion unit 7 is controlled by the control unit 10. It is noted that a DC/DC converter may be provided between the conversion unit 7 and the storage battery 8, but is not shown here, for simplification purpose.

In addition, for example, on one of the AC paths 4, a fuse 11 and a current sensor 12 are provided on the input side, and a fuse 13 is provided on the output side. Also, a current sensor 14 is provided on one of two electric paths connecting the conversion unit 7 and the AC paths 4. Outputs from the voltage sensors 5, 6 and detection outputs from the current sensors 12, 14 are sent to the control unit 10. It is noted that the fuse 13 and the current sensor 14 are respectively for overcurrent protection and current detection when a power is supplied from the storage battery 8 to a load.

The AC switch 9 is interposed on one of the AC paths 4, between the input end Tin and a connection point P at which the conversion unit 7 is connected to the AC paths 4. The AC switch 9 includes a relay contact 91 to be electromagnetically driven, and a bidirectional semiconductor switch 90 connected in parallel to the relay contact 91. The semiconductor switch 90 is composed of a pair of semiconductor switch elements Q1, Q1 having parallel diodes d1, d2 and connected in series in directions opposite to each other. It is noted that the AC switch 9 may be provided on the other one of the AC paths 4 or may be provided on both of the AC paths 4.

The semiconductor switch elements Q1, Q2 are, for example, IGBTs (Insulated Gate Bipolar Transistors), and parallel diodes d1, d2 are respectively connected thereto with polarities opposite to each other. It is noted that the semiconductor switch elements Q1, Q2 may be MOSFETs (Metal-Oxide-Semiconductor Field Effect Transistors) having parallel diodes d1, d2 as body diodes.

The relay contact 91 and the semiconductor switch elements Q1, Q2 are controlled by the control unit 10.

The control unit 10 includes, for example, a computer, and achieves a necessary control function by the computer executing software (computer program). The software is stored in a storage device (not shown) of the control unit 10. It is noted that the control unit 10 may be configured by a circuit formed from only hardware not including a computer.

It is noted that a control power supply voltage needed in the power supply device 100 can be obtained from the input voltage or the storage battery 8.

Here, as a reference, the relay contact 91 and the semiconductor switch elements Q1, Q2 will be compared. Regarding operation time, the time from excitation of the relay coil until contact operation in the relay contact 91 is several milliseconds to several tens of milliseconds, and thus the operation is slower than those of the semiconductor switch elements Q1, Q2. The operation times of the semiconductor switch elements Q1, Q2 are only several microseconds.

Regarding resistance (ON resistance), the resistance of the relay contact 91 is as low as several milliohms, and the resistances of the semiconductor elements Q1, Q2 are as high as several tens of milliohms to several hundreds of milliohms.

<<Basic Operation of Power Supply Device>>

In the power supply device 100, for example, the plug 1 is connected to an outlet 15 of a commercial power supply, and an electric apparatus (not shown) as a load is connected to the AC output outlet 3. It is noted that an autonomous output outlet provided to a power conditioner for photovoltaic generation may be used instead of the outlet of the commercial power supply.

Normally, the control unit 10 executes a "current conduction mode" in which a voltage inputted from the external outlet 15 is directly outputted to the AC output outlet 3. At this time, the relay contact 91 is closed and the semiconductor switch 90 is opened. In addition, the control unit 10 performs power conversion from AC to DC using the conversion unit 7, to charge the storage battery 8.

In a case of supplying a power from the storage battery 8 to the load, the control unit 10 opens the AC switch 9. In addition, the control unit 10 causes the conversion unit 7 to perform power conversion from DC to AC, to execute a "storage battery discharge mode" in which a power discharged from the storage battery 8 is supplied to the load.

The storage battery 8 is discharged to supply power in the following cases:

(#1) case where power outage (or stop of electric generation) of the commercial power supply, etc., occurs or the plug 1 is extracted from the outlet 15, and (#2) case of desiring to supply power from the storage battery 8 without depending on an output from the outlet 15, by manipulation of a manipulation switch (not shown).

<<Switch Control (Normal) of Power Supply Device>>

Next, normal switch control executed by the control unit 10 will be described in detail.

Figure 2:
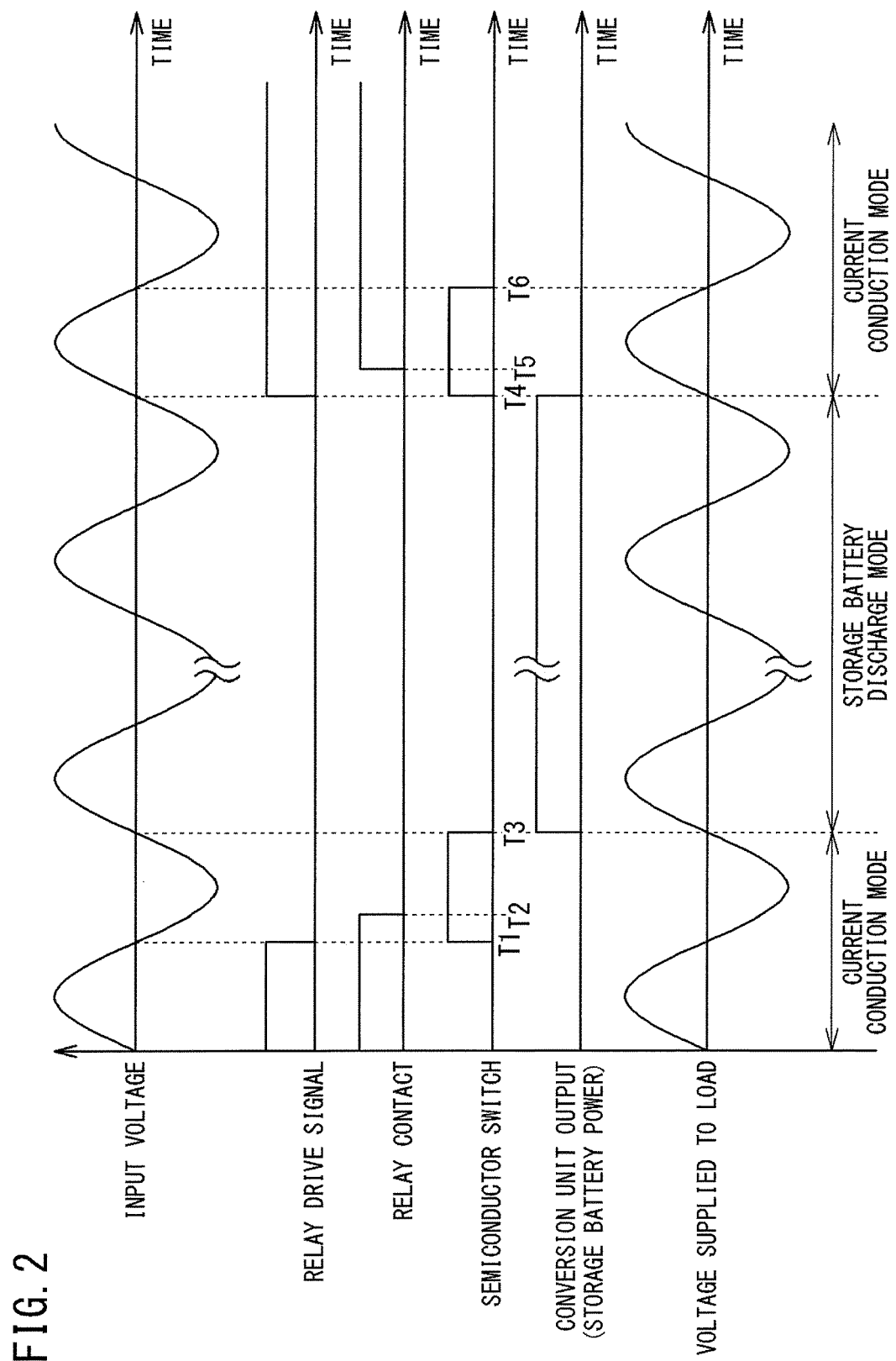
FIG. 2 is a diagram showing voltage signals and the like at various parts, and mode shift, in which, from the above, an input voltage, a relay drive signal (H level: driven), a relay contact (H level: closed), a semiconductor switch (H level: closed), conversion unit output (H level: during AC output operation), a voltage supplied to the load, are shown.

FIG. 2 is a diagram showing voltage signals and the like at various parts, and mode shift. In FIG. 2, from the above, the input voltage, a relay drive signal (H level: driven), the relay contact (H level: closed), the semiconductor switch (H level: closed), the conversion unit output (H level: during AC output operation), a voltage supplied to the load, are shown.

In FIG. 2, the input voltage and the voltage supplied to the load have AC sine waveforms at a frequency of 50 Hz or 60 Hz.

In order to perform shifting from the current conduction mode to the storage battery discharge mode, first, at time T1 which is a zero cross point of the input voltage, the control unit 10 controls the semiconductor switch 90 (semiconductor switch elements Q1, Q2) to be closed and controls the relay contact 91 to be opened.

The semiconductor switch 90 has a fast response speed (for example, several microseconds) and therefore is closed immediately. Since the semiconductor switch 90 is closed immediately, disturbance (instantaneous power outage or voltage variation) of the voltage supplied to the load does not occur. Subsequently, at time T2 when the relay contact 91 is opened, since the contacts of the relay contact 91 are short-circuited with each other due to closing of the semiconductor switch 90, no arc occurs and the relay contact 91 is not subjected to stress. It is noted that the period from T1 to T2 is equal to or shorter than half cycle of the frequency of the input voltage.

The semiconductor switch 90 closed at time T1 is opened at time T3 which is the next nearest zero cross point. At the same time as the opening, output of the conversion unit 7 rises and thus the current conduction mode smoothly shifts to the storage battery discharge mode, so that the voltage supplied to the load is not interrupted. The semiconductor switch 90, when opened at time T3, has finished its role here at this stage.

Eventually, the period during which a current flows through the semiconductor switch 90 is half cycle, and therefore the current conduction capacity required of the semiconductor switch 90 can be reduced. The lower the current conduction capacity is, the lower the cost of the semiconductor switch is. Therefore, if the current conduction capacity can be reduced, the semiconductor switch 90 with comparatively low cost can be used.

Next, in order to perform shifting from the storage battery discharge mode to the current conduction mode, first, at time T4 which is a zero cross point of the input voltage, the control unit 10 controls the semiconductor switch 90 (semiconductor switch elements Q1, Q2) to be closed and controls the relay contact 91 to be closed. At the same time, the control unit 10 stops output of the conversion unit 7 and shifts to the current conduction mode.

The semiconductor switch 90 has a fast response speed (for example, several microseconds) and therefore is closed immediately. Since the semiconductor switch 90 is closed immediately, the peak value of an inrush current is reduced, and in addition, since the current flows through the semiconductor switch 90, the relay contact 91 is free of stress. In addition, disturbance (instantaneous power outage or voltage variation) of the voltage supplied to the load does not occur. Subsequently, at time T5 when the relay contact 91 is closed, since the contacts of the relay contact 91 are short-circuited with each other due to closing of the semiconductor switch 90, the relay contact 91 is not subjected to stress. It is noted that the period from T4 to T5 is equal to or shorter than half cycle of the frequency of the input voltage.

The semiconductor switch 90 closed at time T4 is opened at time T6 which is the next nearest zero cross point. The semiconductor switch 90, when opened at time T6, has finished its role here at this stage.

Eventually, the period during which a current flows through the semiconductor switch 90 is half cycle, and therefore the current conduction capacity required of the semiconductor switch 90 can be reduced. The lower the current conduction capacity is, the lower the cost of the semiconductor switch is. Therefore, if the current conduction capacity can be reduced, the semiconductor switch 90 with comparatively low cost can be used.

As described above, in a case of shifting from the current conduction mode to the storage battery discharge mode under presence of the input voltage, the AC switch 9 executes, through control by the control unit 10, an "OFF sequence" in which closing of the semiconductor switch 90, opening of the relay contact 91, and then opening of the semiconductor switch are performed in this order. On the other hand, in a case of shifting from the storage battery discharge mode to the current conduction mode under presence of the input voltage, the AC switch 9 executes, through control by the control unit 10, an "ON sequence" in which closing of the semiconductor switch 90, closing of the relay contact 91, and then opening of the semiconductor switch are performed in this order.

Performing switch control as described above enables enhancement of the durability of the relay contact of the AC switch 9.

In addition, since the electric paths are opened and closed at zero cross points, occurrences of a turn-on current surge and a turn-off current surge can also be suppressed.

<<Fuse Blowout Detection>>

Next, fuse blowout detection will be described. In FIG. 1, in the current conduction mode, when an excessive current flows in such a case where, for example, a short-circuit fault has occurred on the load connected to the AC output outlet 3, the fuses 11, 13 are blown out to protect the circuit and electric wires. In the storage battery discharge mode, when an excessive current flows, the fuse 13 is blown out to protect the circuit and electric wires.

Figure 3:
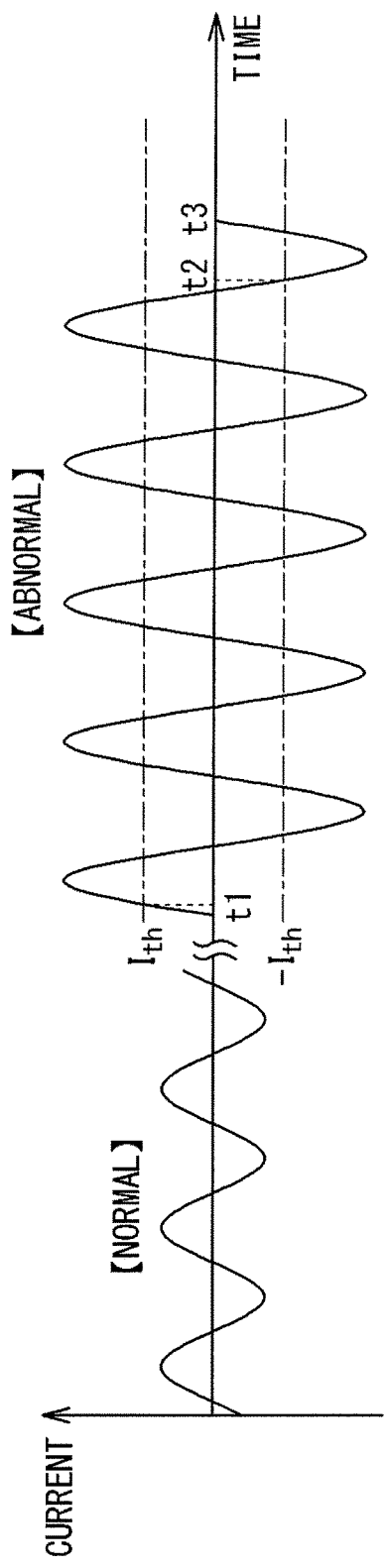
FIG. 3 is a waveform diagram showing an example of change in a current when, for example, a fuse is blown out.

FIG. 3 is a waveform diagram showing an example of change in a current when, for example, the fuse 11 is blown out. In FIG. 3, in a normal state, the current flows within an allowable range. When abnormality such as short-circuit fault occurs, the absolute value of the current exceeds a threshold value $I_{th}$. For example, the control unit 10 samples detection output from the current sensor 12 (FIG. 1) at 20 kHz. If the frequency of the current is 50 Hz, sampling is performed 400 times per wavelength (20 kHz/50 Hz).

For example, at time t1, excess over the threshold value is observed for the first time, and hereafter excess over the threshold value continues intermittently. Then, at time t2, the control unit 10 determines that the current exceeding the threshold value has flowed during a predetermined period (t2−t1). Then, if the current becomes zero at time t3, the control unit 10 can detect that the fuse 11 is blown out, on the basis of a "process" through which an excessive current has flowed and a "result" that the current has become zero. In this way, blowout of the fuse 11 (13) can be detected by measuring the current with use of one current sensor 12. In a case of storage battery discharge mode, similarly, blowout of the fuse 13 can be detected by measuring the current with use of one current sensor 14.

<<Switch Control (Specific Condition) of Power Supply Device>>

Next, switch control executed by the control unit 10 under specific conditions will be described in detail. The specific conditions are a case where the current conduction mode is activated for the first time and a case where a short-circuit fault or the like has occurred on the load in the current conduction mode.

Figure 4:
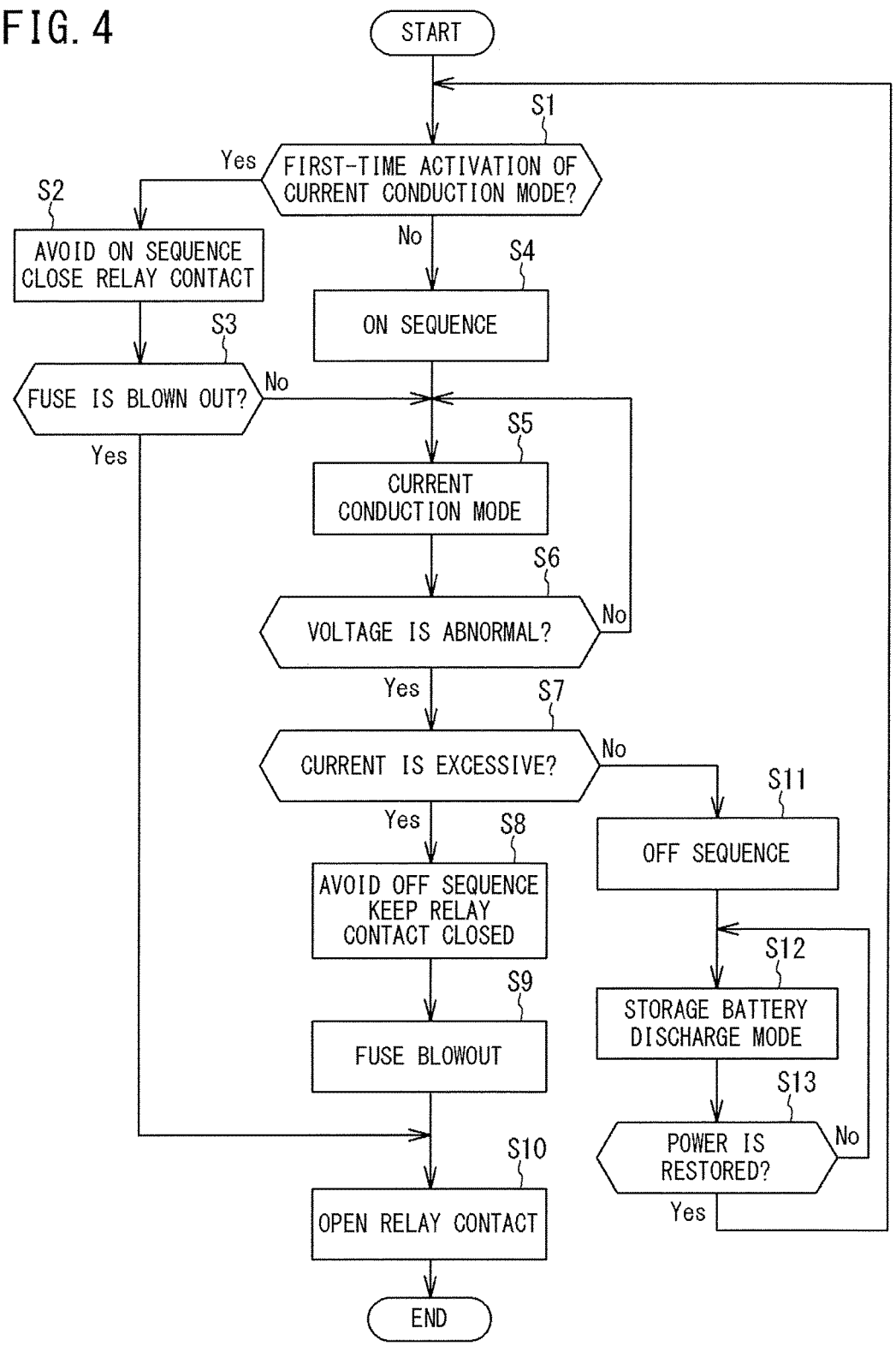
FIG. 4 is an example of a flowchart of switch control including control of an AC switch under specific conditions.

FIG. 4 is an example of a flowchart of switch control including control of the AC switch 9 under the specific conditions. In FIG. 4, when the process is started, first, the control unit 10 determines whether or not the current conduction mode is activated for the first time (step S1). Whether or not the current conduction mode is activated for the first time can be recognized from a flag stored in the control unit 10. When operation of the power supply device 100 is stopped, the flag is reset. Here, in a case of first-time activation, the control unit 10 closes only the relay contact 91 while avoiding the aforementioned ON sequence (step S2). That is, the semiconductor switch 90 is not closed. Subsequently, the control unit 10 determines whether or not the fuse 11 or 13 (hereinafter, simply referred to as fuse 11) is blown out, by the determination manner described above (step S3).

If the fuse 11 is blown out in step S3, the present state is a so-called short-circuit closed state and therefore the control unit 10 opens the relay contact 91 (step S10), and then the process is ended. As a result, even if short-circuit closing is performed, the semiconductor switch 90 is not closed but is protected. The relay contact 91 can withstand even an excessive current to a certain extent within a short time until the fuse 11 is blown out.

On the other hand, if the fuse 11 is not blown out in step S3, the present state is normal and therefore the control unit 10 executes the current conduction mode (step S5). After the current conduction mode is executed, the control unit 10 monitors whether voltage abnormality has occurred (step S6), while continuously executing the current conduction mode (repetition of steps S5, S6). If voltage abnormality (reduction) has occurred in step S6, the control unit 10 determines whether or not the current is excessive (for example, equal to or greater than a threshold value where short-circuit is assumed), on the basis of a detection signal from the current sensor 12 (step S7).

If the current is excessive, there is a possibility that a load short-circuit fault has occurred, and therefore the control unit 10 avoids the OFF sequence and keeps the relay contact 91 closed (step S8). Thus, the semiconductor switch 90 is not closed. Due to the excessive current flow, the fuse 11 is blown out (step S9), and after the blowout is detected, the control unit 10 opens the relay contact 91 (step S10), and then the process is ended. As a result, even if a short-circuit fault has occurred in the current conduction mode, the semiconductor switch 90 is not closed but is protected. The relay contact 91 can withstand even an excessive current to a certain extent within a short time until the fuse 11 is blown out.

If the current is not excessive in step S7, typically, power outage is assumed. In this case, the control unit 10 executes the OFF sequence (step S11) and executes the storage battery discharge mode (step S12). Thereafter, power restoration is awaited (step S13), and if the power is restored, the control unit 10 returns to step S1 to determine whether or not the current conduction mode is activated for the first time. Here, the flag indicates 1 (first-time activation has been already done), and therefore the control unit 10 executes the ON sequence (step S4). Hereafter, the operation from step S5 is to be performed in the same manner.

As described in detail above, in the power supply device 100, when the current conduction mode is activated for the first time, the control unit 10 closes only the relay contact 91 while keeping the semiconductor switch 90 opened. Thus, when an excessive current flows in such a case where, for example, the load connected to the output end Tout is short-circuited, only the relay contact 91 is caused to conduct the excessive current, while no current flows through the semiconductor switch 90. In addition, also when an excessive current is detected in the current conduction mode, the control unit 10 keeps only the relay contact 91 closed while keeping the semiconductor switch 90 opened. Thus, when a short-circuit fault or the like has occurred in the current conduction mode, the relay contact 91 is caused to conduct the excessive current, while no current flows through the semiconductor switch 90. In this way, the excessive current is prevented from flowing through the semiconductor switch 90, whereby failure of the semiconductor switch 90 can be prevented.

Thus, execution of the ON sequence at the first-time activation of the normal mode, and execution of the OFF sequence in the normal operation when an excessive current such as short-circuit current flows in the normal mode and thereby the input voltage is reduced, are avoided as an exception, whereby the semiconductor switch 90 can be protected. In the normal operation, on the other hand, consumption of the relay contact 91 can be suppressed by execution of the ON sequence or the OFF sequence.

In addition, the fuse 11 is provided on the AC path 4. Therefore, by the fuse 11 being blown out by an excessive current, the period during which the excessive current flows through the relay contact 91 can be reduced to be a short time.

In addition, the control unit 10 determines that the fuse is blown out, on the basis of a phenomenon in which, after a current detected by the current sensor 12 reaches an abnormality threshold, the current ends up not being detected. In this case, the blowout of the fuse 11 is taken by a process and a result, and thus can be detected by one current sensor 12. The abnormality threshold as used herein corresponds to a condition that a current exceeding the maximum current for a normal case continues being detected during a predetermined period. Thus, detection according to the time-limit characteristics of fuse blowout can be performed by current and time.

It is noted that, if the relay contact 91 has a sufficient current interruption capacity, it is also possible to use the relay contact 91 as a circuit breaker without the fuse 11.

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

On the other hand, all the elements in the above embodiments and the drawings may be taken as the invention.

REFERENCE SIGNS LIST 1 plug
2 power supply cord
3 AC output outlet
4 AC path
5 first voltage sensor
6 second voltage sensor
7 conversion unit
8 storage battery
9 AC switch
10 control unit
11, 13 fuse
12, 14 current sensor
15 outlet
90 semiconductor switch
91 relay contact
100 power supply device
d1, d2 parallel diode
P connection point
Q1, Q2 semiconductor switch element
Tin input end
Tout output end

The invention claimed is:

1. A power supply device comprising:
an AC path from an input end to an output end in the power supply device;
a current sensor configured to detect a current flowing through the AC path;
a conversion unit connected to the AC path and being capable of bidirectional power conversion;
a storage battery connected to the AC path via the conversion unit;
an AC switch provided between the input end and a point at which the conversion unit is connected to the AC path, the AC switch including a relay contact and a semiconductor switch connected in parallel to the relay contact; and
a control unit configured to control the conversion unit and the AC switch, thereby having a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit, wherein
when the current conduction mode is activated for the first time, and when the current sensor detects an excessive current during the current conduction mode, the control unit closes only the relay contact while keeping the semiconductor switch opened.

2. The power supply device according to claim 1, wherein
as a normal operation,
at a time of shifting from the current conduction mode to the storage battery discharge mode, the control unit executes an OFF sequence in which closing of the semiconductor switch, opening of the relay contact, and then opening of the semiconductor switch are performed in this order, and at a time of shifting from the storage battery discharge mode to the current conduction mode, the control unit executes an ON sequence in which closing of the semiconductor switch, closing of the relay contact, and then opening of the semiconductor switch are performed in this order, and
as an exception,
when the current conduction mode is activated for the first time, the control unit closes only the relay contact while avoiding the ON sequence, and when the current sensor detects an excessive current during the current conduction mode, the control unit closes only the relay contact while avoiding the OFF sequence.

3. The power supply device according to claim 2, further comprising a fuse which is provided on the AC path and is to be blown out after the current sensor detects an excessive current.

4. The power supply device according to claim 3, wherein the control unit determines that the fuse is blown out, on the basis of a phenomenon in which, after the current detected by the current sensor reaches an abnormality threshold, the current ends up not being detected.

5. The power supply device according to claim 4, wherein the abnormality threshold corresponds to a condition that a current exceeding a maximum current for a normal case continues being detected during a predetermined period.

6. The power supply device according to claim 1, further comprising a fuse which is provided on the AC path and is to be blown out after the current sensor detects an excessive current.

7. The power supply device according to claim 6, wherein the control unit determines that the fuse is blown out, on the basis of a phenomenon in which, after the current detected by the current sensor reaches an abnormality threshold, the current ends up not being detected.

8. The power supply device according to claim 7, wherein the abnormality threshold corresponds to a condition that a current exceeding a maximum current for a normal case continues being detected during a predetermined period.

9. A switch control method for a power supply device that includes: an AC path from an input end to an output end in the power supply device; a current sensor configured to detect a current flowing through the AC path; a conversion unit connected to the AC path and being capable of bidirectional power conversion; a storage battery connected to the AC path via the conversion unit; an AC switch provided between the input end and a point at which the conversion unit is connected to the AC path, the AC switch including a relay contact and a semiconductor switch connected in parallel to the relay contact; and a control unit configured to control the conversion unit and the AC switch, the switch control method being executed by the control unit, wherein
  the control unit executes a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit, and
  when the current conduction mode is activated for the first time, and when the current sensor detects an excessive current during the current conduction mode, the control unit closes only the relay contact while keeping the semiconductor switch opened.

10. A power supply device comprising:
an AC path from an input end to an output end in the power supply device;
a current sensor configured to detect a current flowing through the AC path;
a conversion unit connected to the AC path and being capable of bidirectional power conversion;
a storage battery connected to the AC path via the conversion unit;
an AC switch provided between the input end and a point at which the conversion unit is connected to the AC path, the AC switch including a relay contact and a semiconductor switch connected in parallel to the relay contact; and
a control unit configured to control the conversion unit and the AC switch, thereby having a current conduction mode in which a power is supplied from the input end through the AC switch which is closed and the AC path, to reach the output end and thus supplied to a load connected to the output end, and a storage battery discharge mode in which the AC switch is opened and a power is supplied from the storage battery to the load via the conversion unit, wherein
an operation in which closing of the semiconductor switch, opening of the relay contact, and then opening of the semiconductor switch are performed in this order is defined as an OFF sequence, and an operation in which closing of the semiconductor switch, closing of the relay contact, and then opening of the semiconductor switch are performed in this order is defined as an ON sequence, and
in operating the AC switch,
  (a) when the current conduction mode is activated for the first time, the control unit closes only the relay contact while avoiding the ON sequence,
  (b) when shifting to the storage battery discharge mode in a state in which the current detected by the current sensor is not abnormal during the current conduction mode, the control unit executes the OFF sequence,
  (c) when the current sensor detects an excessive current during the current conduction mode, the control unit closes only the relay contact while avoiding the OFF sequence, and
  (d) when shifting from the storage battery discharge mode to the current conduction mode, the control unit executes the ON sequence.

* * * * *